(12) United States Patent
Jha et al.

(10) Patent No.: US 9,769,788 B2
(45) Date of Patent: Sep. 19, 2017

(54) COVERAGE CONSTRAINED DEVICES AND PAGING METHOD

(71) Applicant: Intel IP Corporation, Santa Clara, CA (US)

(72) Inventors: Satish Chandra Jha, Hillsboro, OR (US); Maruti Gupta, Portland, OR (US); Mohammad Mamunur Rashid, Hillsboro, OR (US); Rath Vannithamby, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 106 days.

(21) Appl. No.: 14/706,152

(22) Filed: May 7, 2015

(65) Prior Publication Data

US 2016/0100380 A1 Apr. 7, 2016

Related U.S. Application Data

(60) Provisional application No. 62/060,423, filed on Oct. 6, 2014.

(51) Int. Cl.
*H04W 68/00* (2009.01)

(52) U.S. Cl.
CPC .................. *H04W 68/005* (2013.01)

(58) Field of Classification Search
CPC ..... H04W 76/02; H04W 76/04; H04W 16/10; H04W 72/042; H04W 68/00; H04W 68/02; H04W 68/005

(Continued)

(56) References Cited

U.S. PATENT DOCUMENTS

2005/0259622 A1* 11/2005 Czaja .................. H04L 5/12
370/335
2006/0209748 A1* 9/2006 An ...................... H04W 68/00
370/328

(Continued)

FOREIGN PATENT DOCUMENTS

WO WO-2014110804 A1 7/2014
WO WO-2016057137 A1 4/2016

OTHER PUBLICATIONS

"International Application Serial No. PCT/US2015/048061, International Search Report mailed Jan. 6, 2016", 4 pgs.

(Continued)

*Primary Examiner* — Kamran Afshar
*Assistant Examiner* — Farid Seyedvosoghi
(74) *Attorney, Agent, or Firm* — Schwegman Lundberg & Woessner, P.A.

(57) ABSTRACT

Devices and methods of paging user equipment (UE) are generally described. An evolved Node-B (eNB) may transmit legacy and extended coverage paging messages having different Paging Radio Network Temporary Identifiers (P-RNTIs) to UEs. Each extended coverage paging message may contain the same information, which coverage constrained UEs may combine to achieve a predetermined link budget and subsequently decode. The coverage constrained UEs may ignore legacy paging messages prior to decoding the legacy paging messages. The extended coverage paging messages may be transmitted in non-legacy paging occasions that may span multiple paging cycles. Each paging cycle may contain 0, 1 or multiple extended coverage paging occasions. The UE may be provided the physical resource blocks (PRBs) used for the extended coverage paging message through a system information message. The PRBs may (Continued)

be assigned as a fixed or semi-statically assigned set of PRBs or a dynamically assigned set of PRBs.

22 Claims, 3 Drawing Sheets

(58) Field of Classification Search
USPC ..... 455/458, 426.1, 515; 370/326, 328, 335, 370/36, 342, 345
See application file for complete search history.

(56) References Cited

U.S. PATENT DOCUMENTS

| | | | | | |
|---|---|---|---|---|---|
| 2010/0240400 | A1* | 9/2010 | Choi | ................. | H04W 68/02 455/458 |
| 2012/0122495 | A1* | 5/2012 | Weng | ................. | H04W 68/025 455/458 |
| 2013/0015953 | A1* | 1/2013 | Hsu | ................. | H04W 4/005 340/7.46 |
| 2014/0098761 | A1* | 4/2014 | Lee | ................. | H04W 74/006 370/329 |
| 2014/0128085 | A1* | 5/2014 | Charbit | ................. | H04L 5/00 455/450 |
| 2014/0204825 | A1* | 7/2014 | Ekpenyong | ................. | H04L 5/0044 370/312 |
| 2014/0302856 | A1* | 10/2014 | Nory | ................. | H04W 48/10 455/437 |
| 2015/0289228 | A1* | 10/2015 | Sikri | ................. | H04W 52/0238 370/311 |
| 2016/0205659 | A1* | 7/2016 | Bergman | ................. | H04L 1/1812 370/252 |

OTHER PUBLICATIONS

"International Application Serial No. PCT/US2015/048061, Written Opinion mailed Jan. 6, 2016", 9 pgs.

"PRACH resource multiplexing to support low cost MTC and coverage enhancement", R1-140027 3GPP TSG RAN WG1 Meeting #76, (Feb. 2014), 1-6.

"Remaining issues of new UE category/type for low cost & enhanced coverage MTC UE", R1-140113, 3GPP TSG-RAN WG1, (Feb. 1, 2014).

"Study on provision of low-cost Machine-Type Communications (MTC) User Equipments (UEs) based on LTE", 3GPP: TSG RAN, 3GPP TR 36.888 V12.0.0, (Jun. 26, 2013).

\* cited by examiner

COVERAGE CONSTRAINED DEVICES AND PAGING METHOD

PRIORITY CLAIM

This application claims the benefit of priority to U.S. Provisional Patent Application Ser. No. 62/060,423, filed Oct. 6, 2014, and entitled "MECHANISM TO SEPARATE THE PAGING OPERATION OF COVERAGE CONSTRAINED DEVICES FROM THAT OF REGULAR UES," which is incorporated herein by reference in its entirety.

TECHNICAL FIELD

Embodiments pertain to radio access networks. Some embodiments relate to paging mechanisms in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

With the increase in different types of devices communicating over networks to servers and other computing devices, usage of 3GPP LTE systems has increased. In particular, both typical user equipment (UE) such as cell phones and UEs using Machine Type Communication (MTC) currently use 3GPP LTE systems. MTC UEs may generally be non-user oriented, such as sensors installed in equipment. MTC UEs may pose a particular communication challenge due to small battery size and low power availability. In particular, there are a number of circumstances in which the network may wish to communicate with a UE to notify the UE of incoming data or modification of system information. To initiate communications with a UE in idle mode, the serving base station (enhanced Node B (eNB)) may page the UE by sending a paging message. Due to their nature, MTC UEs may have a number of different types of communication restrictions, including limitations for paging such as wake up times, response times and bandwidth. In these cases, MTC UEs may not be able to communicate with the serving eNB in a compatible manner to satisfy normal Radio Link Control (RLC) protocol requirements within the current 3GPP standard, Release 12 (3GPP TS 36.213). This may be particularly difficult in circumstances in which the MTC UEs are located in geographic areas buildings or isolated geographical areas with poor network coverage or in which poor signal conditions exist. However, while MTC UEs are an ever-growing percentage of communications in 3GPP networks, the effects on user-oriented non-MTC UEs may remain of importance when designing system changes in 3GPP networks.

It would be therefore desirable to enable the network to enable paging of MTC UEs such that restrictions on MTC UEs paging do not impact paging for non-MTC UEs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
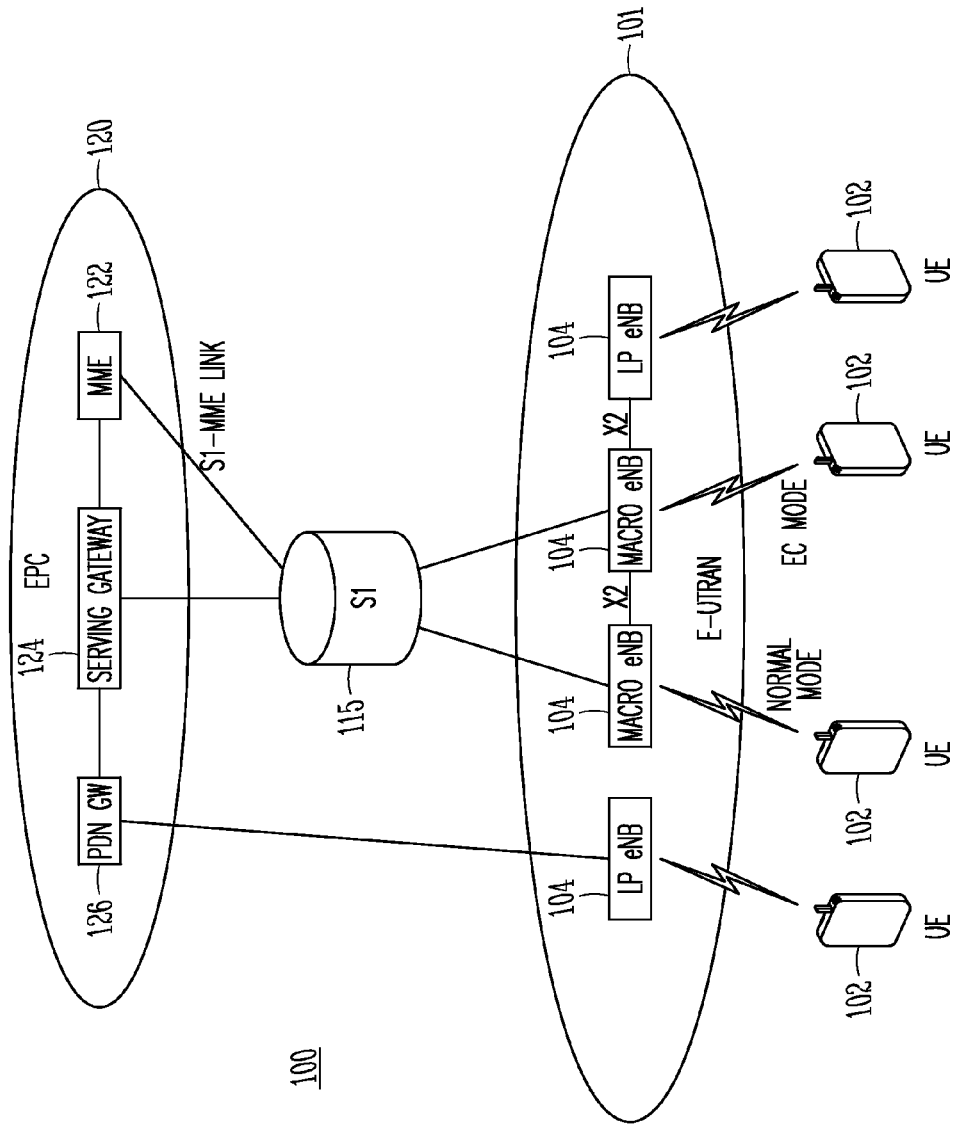
FIG. 1 shows an example of a portion of an end-to-end network architecture of an LTE network with various components of the network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved nodeBs (eNBs) 104 (which may operate as base stations) for communicating with user equipment (UE) 102. The eNBs 104 may include macro eNBs and low power (LP) eNBs.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, such as the LTE unlicensed band, or may operate on different frequency bands with each cell operating in a different frequency band or only cells of different sizes operating on different frequency bands. As used herein, the term low power (LP) eNB refers to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers) *14 (symbols)=168 resource elements.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

The PDCCH may use control channel elements (CCEs) to convey the control information. Before being mapped to resource elements, the PDCCH complex-valued symbols may be first organized into quadruplets, which may be then permuted using a sub-block inter-leaver for rate matching. Each PDCCH may be transmitted using one or more of these CCEs, depending on the size of DCI and the channel condition, where each CCE corresponds to nine sets of four physical resource elements known as resource element groups (REGs). Four QPSK symbols are mapped to each REG. There may be four or more different PDCCH formats defined in LTE with different numbers of CCEs (e.g., aggregation level, L=1, 2, 4, or 8). As will be discussed in more detail below, the PDCCH may be used by the network to provide paging to UE in idle mode.

Figure 2:
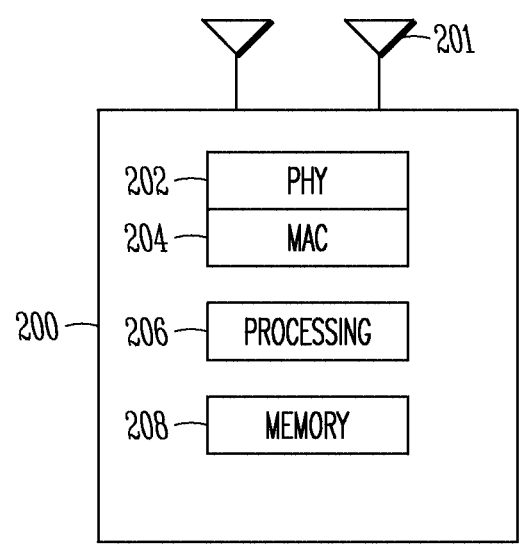
FIG. 2 illustrates a functional block diagram of a communication device in accordance with some embodiments.

FIG. 2 illustrates a functional block diagram of a communication device (e.g., an UE or eNB) in accordance with some embodiments. The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to 1/10 of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a LTE communication network, an LTE-Advanced communication network, a fifth generation (5G) or later LTE communication network or a high speed downlink/uplink access (HSDPA/HSUPA) communication network, although the scope of the invention is not limited in this respect.

In some embodiments, the UE may be a Low Complexity/Low Cost (LC) or LC-MTC UE. The LC-MTC UE may belong to a class of UEs referred that have limited functionality compared with normal UEs and may communicate with general eNBs or be limited to communicating with eNBs specialized to interact with LC-MTC UEs. These UEs are referred to herein as coverage constrained UEs. A coverage constrained UE may have limitations, such as being able to communicate over a limited RF or BW range, e.g., to 1.4 MHz, (rather than 20 MHz for a normal UE) and having a lower maximum Transport Block Size for unicast and/or broadcast transmission e.g., up to 1000 bits. Examples of coverage constrained UEs include UE category 0 defined in 3GPP Rel-12 (e.g., TR 36.888) or Rel-13 LC MTC. As described herein, the coverage constrained UE are assumed to operate in an enhanced coverage (EC) mode. The EC mode may refer to a mode of operation of the UE in which the UE cannot find a serving cell with sufficient link gain (i.e., the UE may not be within normal coverage of any cell) but can find a cell using EC procedures (i.e., the UE may be within extended coverage of a cell). In EC mode, the receiving device (e.g., either UE or eNB) may instead generate a predetermined amount of link gain through repeated transmissions by the transmitting device (e.g., the other of the UE or eNB). A UE operating in normal mode may communicate with the eNB through individual communications having the predetermined amount of link gain. In the normal mode, UEs communicate using legacy communications. The term legacy, as used herein, may refer to any device or system defined to communicate using protocols developed before 3GPP Rel-13. These embodiments are described in more detail below. In some embodiments, coverage constrained UEs, like normal UEs, may operate in normal mode or EC mode; in such embodiments, the methods described herein refer to coverage constrained UEs in EC mode.

The UE may interact with the eNB in several modes. These modes include a Radio Resource Control (RRC) connected mode and an idle mode. To control the modes of the UE, the eNBs and elements of the RAN or core network may have various timers associated with the UE. These timers may control state changes for the UE. In one embodiment, a RRC connection may for example be established between the UE and the eNB. One or more inactivity timers, such as the T3413 timer, may be used by the eNB to determine the time from the last UE activity and consequently indicate to the UE to transition between various RRC connected states, as well as between an RRC connected state and an idle state. For example, the network may release the UE to idle mode, in which there is no RRC connection established between the UE and the eNB, while retaining information about the tracking area in which the UE is registered. This tracking area information may be used to page the UE, as discussed below.

After the UE enters idle mode, the eNB may subsequently transmit a paging message to the UE to notify the UE about incoming data, such as a phone call. The paging message may result in the UE initiating the establishment of an RRC connection. In some embodiments, a paging procedure may be initiated by the MME, which may send S1-AP paging messages to the eNBs within the tracking area via the S1 interface using an S1 Application Protocol. Each eNB may then transmit RRC paging messages via a radio interface using the RRC protocol. The RRC paging message may include information directed only to the eNB information from multiple S1 AP paging messages as, in one embodiment up to 16 different UEs may be paged at a time, using a SAE Temporary Mobile Subscriber Identity (S-TMSI), in a single RRC paging message for each UE. The S-TMSI is a temporary UE identity provided by the core network that uniquely identifies the UE within the tracking area and may be constructed from the MME code (MMEC) (which identifies a MME uniquely within a MME group) and the MME TMSI (M-TMSI). In particular, UEs may monitor the PDCCH at regular intervals (set by the DRX parameters) to check for the presence of a paging message. If the PDCCH indicates that a paging message is transmitted in the subframe, the UE may demodulate the paging channel (PCH) to see if the paging message is directed to it. When paging is initiated by the MME, the eNB may determine a paging occasion in the PDCCH monitored by the UE. In other embodiments, the eNB may initiate paging. For example, the eNB may initiate paging due to an Earthquake and Tsunami Warning System (ETWS) or system information change. In this case, paging may be transmitted on all paging occasions, whether legacy or EC paging occasions, as the paging message may not be directed to a particular UE.

However, if, for example, the UE is in an area poor coverage, the UE may not be able to obtain the information of the paging message from the initial transmission. Paging messages may be retransmitted in cases in which the UEs meant to respond to the paging message did not respond before the T3413 timer expires. The value of the T3413 timer may be network dependent and can be up to a few seconds. Without additional repetitions, a UE in such a situation may not be able to obtain the paging message within a reasonable amount of time. In some embodiments however, as paging is a broadcast message, paging may be by specification repeated for all UEs in that cell, regardless of the mode in which the UEs are operating. This may result in undesired repetition of paging for UEs in normal coverage (operating in normal mode), resulting in an inefficient use of network and device resources. Moreover, it may be desirable from a power consumption standpoint to limit the amount of times a coverage constrained UE wakes up to receive paging messages, especially paging messages that are not intended for the coverage constrained UE. Additionally, the bandwidth constraints of, for example, the coverage constrained UE may limit both the paging message to a size less that of the maximum paging message size (fewer than 16 UEs being paged), as well as flexibility of the eNB to schedule paging by forcing the eNB to only use fixed bandwidth resources that the coverage constrained UE is capable of receiving.

To combat at least some of these issues, in some embodiments, different paging procedures may be implemented depending on the type of UE. For example, different paging procedures may be implemented for coverage constrained UEs than other UEs. In such embodiments, the eNB or MIME may determine whether the UE should be paged using extended coverage paging procedures or using legacy paging procedures. This determination may be based, e.g., on the UE capability stored as UE context in the MME, which may be transmitted from the UE to the MME during attachment or a tracking area update (TAU) or via a dedicated non-access stratum (AS) signal. In some embodiments, the extended coverage paging procedure may differ from a legacy paging procedure including by using a different paging RNTI (P-RNTI) and/or different paging occasions, repetitions and paging cycles. The extended coverage paging procedure may allow a coverage constrained UE to combine multiple paging transmissions to achieve a desired link budget for the paging messages that may otherwise be unachievable due to the coverage constrained UE being outside of the nominal range of the serving eNB. The network may, after determining the type of UE (e.g., coverage constrained or normal), and thus any limitations of the UE in receiving paging messages, allocate pre-defined or semi-static PRBs for coverage constrained UEs without impacting the paging mechanism (whose PRBs may be dynamically assigned) for other UEs. The network may subsequently transmit, when the UE is in the RRC connected mode or via a system information message, an indication of the PRBs used for the extended coverage paging message when the network determines that the UE is a coverage constrained UE and for the legacy paging message when the network determines that the UE is a normal UE. In some embodiments, if a large number of UEs are being served by the eNB, it may be possible for most if not all subframes to have paging occasions for different sets of UEs, with the network avoiding assigning PRBs for normal mode paging in PRBs for extended coverage paging. Power reduction may also be achieved by permitting the coverage constrained UEs to avoid decoding the PDSCH of paging messages broadcast for other UEs. The greater flexibility provided to the eNB to repeat the copies of a paging message for a coverage constrained UE enhances the coverage for coverage constrained UEs without impacting paging of the other UEs.

If an eNB supports extended coverage paging capabilities, the eNB may send paging messages for the coverage constrained UE using a P-RNTI specific to the coverage constrained UE (hereinafter referred to as the $P_{CC}$-RNTI) rather than the legacy P-RNTI. Thus, instead of looking for the P-RNTI in the PDCCH, a coverage constrained UE may instead look for a different paging RNTI that the eNB is to use to encode messages sent for the coverage constrained UE. In embodiments in which the coverage constrained UE is subscribed to the ETWS or Commercial Mobile Alert System (CMAS), the eNB may also include the ETWS/CMAS notification in the paging with the $P_{CC}$-RNTI for the coverage constrained UE.

As above, although the eNB may send a paging message to a UE during paging occasions when the UE is in idle mode, the eNB may also transmit a paging message to the UE even when the UE is in the RRC connected mode to notify the UE about a system update. Specifically, the paging message may indicate whether a system information modification flag is true or false. If the system information modification flag is true, the UE may request system information by re-reading all the system information blocks (SIBs). The format of the paging message using the $P_{CC}$-RNTI may be the same as a legacy paging message using the P-RNTI. The system information modification flag information may thus be transmitted on the paging message using the $P_{CC}$-RNTI. The extended coverage paging message may accordingly allow a coverage constrained UE to read only one type of paging message (that sent using the $P_{CC}$-RNTI), ignoring legacy paging messages, while normal mode UEs are able to ignore the extended coverage paging message, thereby permitting backward compatibility since the introduction of the extended coverage paging message does not alter the actions of existing normal mode UEs. The UE may thus decode one type of paging message while ignoring at least one other type of paging messages prior to decoding the other type of paging message. In some embodiments, the UE may ignore paging messages by not turning on the UE or by not activating the transceiver such that the paging messages are simply not received by the UE. In some embodiments, the UE may ignore paging messages by receiving the paging messages but not decoding the paging messages, e.g., discarding the paging messages before decoding the paging messages.

Similar to the P-RNTI, the $P_{CC}$-RNTI may also be a fixed RNTI specified in the 3GPP specification and thus broadcast and visible to all UEs, independent of the mode of a particular UE. For UEs able to communicate with the eNB over the entire system bandwidth, the PRBs for paging messages for the UEs may be allocated by the eNB dynamically. For coverage constrained UEs, which have bandwidth restrictions (e.g., 1.4 MHz), the PRBs may be allocated by the eNB differently. In particular, the $P_{CC}$-RNTI may be provided in the PDCCH such that it is assigned to either a fixed set of PRBs or PRBs assigned semi-statically to accommodate the bandwidth restrictions.

Moreover, both the frequency of $P_{CC}$-RNTI transmissions and the paging cycle may be different from that of normal mode UE paging transmissions to allow for repetitions within a specific extended coverage paging frame. In general, a UE may use Discontinuous Reception (DRX) in idle mode in order to reduce power consumption and increase battery life. The DRX parameters may be provided to the UE in an attach request when the UE initially attaches (or reattaches) to the network, through a TAU communication when the geographic position of the UE changes sufficiently such that the UE changes tracking areas from one set of eNBs to another set of eNBs, or in a dedicated NAS message. During one of these sets of communications, the UE may indicate to the network which type of UE it is (e.g., a coverage constrained UE). Parameters transmitted on the System Information Block 2 (SIB2) may be used by the coverage constrained UE to calculate when to wake to monitor the paging channel. A paging occasion is a subframe in which a P-RNTI (whether legacy or coverage constrained) may be transmitted on the PDCCH addressing the paging message. If the UE detects a P-RNTI on the PDCCH, the UE may demodulate and decode the PDCCH and forward the decoded PCH data to the MAC layer. The PCH transport block may contain the exact identity of the UE being paged. A UE not finding its identity on the detected PCH may discard the information and sleep according to the DRX cycle.

A paging frame may be a radio frame, and may contain one or multiple paging occasions. When DRX is used, the UE may only monitor one P-RNTI per DRX cycle. Two parameters transmitted in the SIB2 may allow UEs to calculate the DRX period and determine when to wake up to monitor for paging messages: defaultPagingCycle (whose value T may be 32, 64, 128 or 256 radio frames) and nB, which may be used to derive the number of subframes used for paging within each radio frame. Valid values of nB are 4T, 2T, T, ½T, ¼T, ⅛T, ¹⁄₁₆T, ¹⁄₃₂T.

Figure 3:
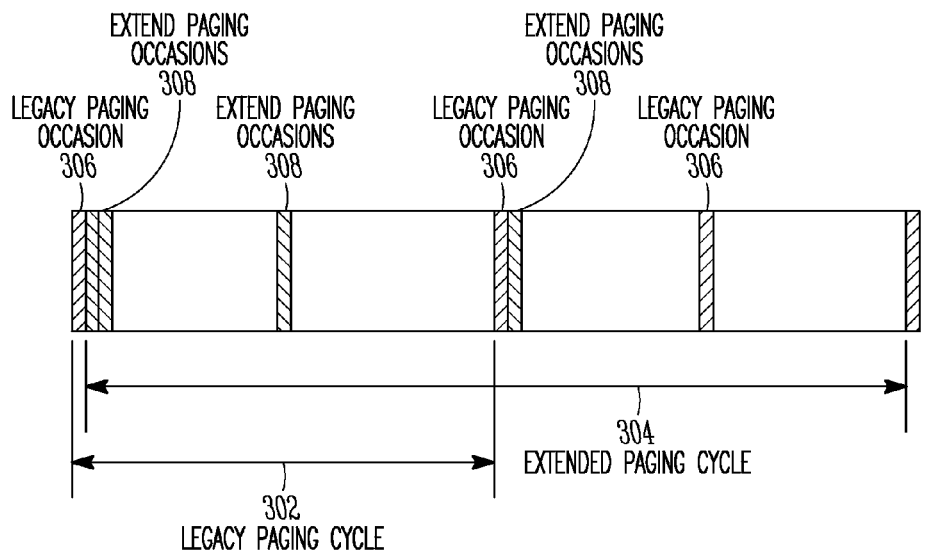
FIG. 3 illustrates paging mechanisms in accordance with some embodiments.

In some embodiments, an extended coverage paging cycle for coverage constrained UEs may be longer than a legacy paging cycle for normal mode UEs, thus the paging cycle interval for extended coverage paging messages may be less frequent than the legacy paging cycle interval for normal UEs. FIG. 3 illustrates paging mechanisms in accordance with some embodiments. Two paging cycles are shown in FIG. 3, a legacy paging cycle 302 and an extended (coverage constrained) paging cycle 304 for the same UE in two cases: a normal mode UE and a coverage constrained UE. As shown in FIG. 3, the legacy paging cycle 302 of one radio frame may be substantially shorter than the extended coverage paging cycle 304, which may be several frames. As shown in FIG. 3, only one legacy paging occasion 306 may occur in one of the legacy paging cycles 302, while in another of the legacy paging cycles 302, multiple legacy paging occasions may occur. Multiple extended coverage paging occasions 308 may occur throughout the extended coverage paging cycle 304, with the extended coverage paging occasions 308 occurring in the same or different subframes between different frames of the extended coverage paging cycle 304. While each paging occasion in a legacy paging cycle 302 may be independent (e.g., the UEs paged may differ), each paging occasion in an extended coverage paging cycle 304 may be duplicative such that the same information is carried by the paging message in each extended coverage paging occasion 308. However, in some embodiments, extended coverage paging occasions 308 in different extended coverage paging cycles 304 may be independent. In some embodiments, in addition to the content of the paging messages in a particular extended coverage paging cycle being the same, the PDSCH resource blocks allocated for the paging message may remain unchanged.

As shown in FIG. 3, one or more extended coverage paging occasions 308 may occur in one frame of the extended coverage paging cycle 304, while no extended coverage paging occasions 308 may occur in another frame of the extended coverage paging cycle 304. In some embodiments, adjacent extended coverage paging occasions 308 may surround one or more legacy paging occasions 306. In some embodiments, adjacent legacy paging occasions 306 may surround one or more extended coverage paging occasions 308. In some embodiments, the extended coverage paging cycle 304 may contain a greater number of paging occasions than the legacy paging cycle 302. In some embodiments, the number of extended coverage paging occasions 308 may be greater than the number of legacy paging occasions 306 in a legacy paging cycle 302. In some embodiments, the number of legacy paging occasions 306 may be greater than the number of extended coverage paging occasions 308 in a legacy paging cycle 302. In some embodiments, within an extended coverage paging cycle 304 that contains multiple legacy paging cycles 302, the number of extended coverage paging occasions 308 may be greater than the number of legacy paging occasions 306 in at least one legacy paging cycle 302 and the number of legacy paging occasions 306 may be greater than the number of extended coverage paging occasions 308 in at least one legacy paging cycle 302. In some embodiments, one or more of the intervals between adjacent extended coverage paging occasions 308 may be longer than one or more of the intervals between adjacent legacy paging occasions 306. In some embodiments, one or more of the intervals between adjacent extended coverage paging occasions 308 may be longer than the longest interval between adjacent legacy paging occasions 306. In some embodiments, each of the intervals between adjacent extended coverage paging occasions 308 may be longer than the longest interval between adjacent legacy paging occasions 306.

The extended coverage paging mechanism may be similar to the above paging mechanism. However, a pair of new parameters that are specific to the DRX cycle for $P_{CC}$-RNTI may be introduced for coverage constrained UEs such as coverage constrained UEs, $T_{CC}$ and $nB_{CC}$ in the SIB2 messages. In such an embodiment, like the legacy T, the values of $T_{CC}$ may start from 32. However, the values of $T_{CC}$ may be extended to a much higher number than for legacy T, e.g., 180000 (30 mins) or longer dependent on the particular set of UEs to be paged. In other embodiments, the values of $T_{CC}$ may start from a different point than the legacy T. In addition, similar to the UE-specific DRX cycle parameters requested by a UE in an attach request or tracking area update message, a UE may request UE-specific DRX cycle parameters longer than the current maximum of 256 in the attach request or tracking area update message. The SIB2 information, provided when the UE is in connected mode or through system information messages, may also define the PRBs in which paging is to occur. This may permit paging for normal UEs to be scheduled throughout the system bandwidth while paging for coverage constrained UEs may be restricted to pre-defined or semi-static PRBs allocated for the coverage constrained UEs. The coverage constrained UE may be able to save power as, rather than decoding at least a header of a legacy paging message intended for normal mode UEs, the coverage constrained UE may avoid decoding a paging message in a normal paging occasion that is targeted for normal mode UEs.

Extended coverage paging may provide coverage enhancement of up to about 20 dB. In some embodiments, the network may define a paging cycle and paging occasions for different levels of coverage enhancement. For example, if 60 repetitions are desired for a particular coverage enhancement, the network may define paging occasions and paging cycles in such a way that each paging message is repeated 60 times before a new paging message for one or more other coverage constrained UEs is initiated. Note that dependent on the enhancement level, the number of repetitions for extended coverage paging may span 30-100 repetitions. The paging cycles and paging occasions for different levels of coverage enhancement may be independent and may overlap. As above, a paging message may contain paging indications for up to 16 UEs. Moreover, as the eNB can page a maximum of 16 users in any paging occasion, there is a maximum idle user support limit in the cell. Thus, if the same paging message is used by normal and coverage constrained UEs, the idle user support capacity of the cell is shared between normal and coverage constrained UEs. The separation of paging for EC mode UEs avoids impact on support for the maximum number of idle normal mode UEs in the cell.

Figure 4:
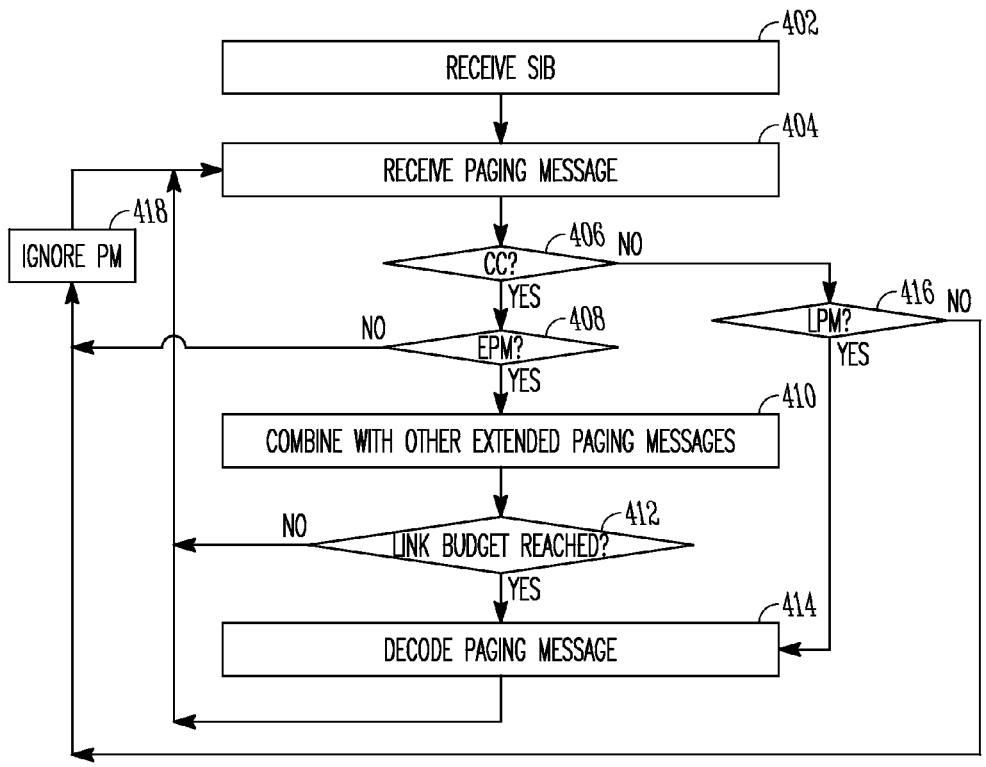
FIG. 4 illustrates a flowchart of a method of an extended coverage paging mechanism in accordance with some embodiments.

FIG. 4 illustrates a flowchart of a method of an extended coverage paging mechanism in accordance with some embodiments. The method may be performed by a UE, such as UE 102 (FIG. 1), to receive the paging message in FIG. 4. In FIG. 4, the UE may transmit an attach request or TAU or dedicated RRC message to the MME, and, in response, receive SIB2 information at operation 402. The SIB2 information may include DRX parameters for normal mode and/or extended coverage paging, dependent on the information provided by the UE. In some embodiments, the DRX parameters may include the P-RNTI (legacy or coverage constrained), legacy defaultPagingCycle and nB values for legacy paging occasions, and/or coverage constrained defaultPagingCycle ($T_{CC}$) and $nB_{CC}$ for the EC mode. The values of $T_{CC}$ may have a higher number that is many multiples the legacy T, for example up to 500-1000 times that of the maximum legacy T value.

At operation 404, a paging message may be transmitted by an eNB serving the UE and received by the UE. The UE may be in idle mode or may be in an RRC connected mode. The paging message may be received in a legacy or extended coverage paging occasion. The paging message may contain a legacy or EC mode P-RNTI in the PDCCH and data in the PDSCH of the paging occasion. The resource block containing the information in the PDCCH and the PDSCH may be dependent on the type of paging occasion, whether legacy or coverage constrained. The paging message may contain information for more than one UE.

The UE may determine whether it is coverage constrained at operation 406. The UE may determine that it is coverage constrained when the UE is unable to obtain a predetermined link budget for communications with the eNB and the UE has limited bandwidth response. In some embodiments, the UE may merely determine characteristics of the paging message. Although not shown, the UE may also determine which enhancement level (e.g., 5 dB, 10 dB, 20 dB) it is in to determine the proper course of action to take with regard to the paging message. When different enhancement levels are available for the UE, the levels may indicate different reception characteristics of the extended coverage paging messages may cause the UE (and perhaps eNB) to act differently for the extended coverage paging messages.

Once the UE determines that it is coverage constrained, or if the determination is not performed, the UE may subsequently determine whether the paging message is an extended coverage paging message at operation 408. The UE may make the determination based on temporal and/or frequency location of the paging occasion, or decoding the PDCCH to determine the P-RNTI. For example, if the paging message occurs at a legacy paging occasion, the UE may determine that the paging transmission is a legacy paging transmission. The information to determine whether the paging message is an extended coverage paging message may be defined by specification or provided to the UE via RRC or other higher layer signaling, such as the SIB2 information.

In response to the UE determining that the paging message is an extended coverage paging message, at operation 410 the UE may combine the extended coverage paging message with other extended coverage paging messages within the same extended coverage paging cycle. The UE may maintain a soft buffer containing the accumulated information from the paging messages provided in the PDSCH of the extended coverage paging transmissions.

The UE may then at operation 412 determine whether the predetermined link budget has been reached. The number of extended coverage paging transmissions received by the UE to meet the link budget may depend on the enhancement level of the UE. If the link budget has not yet been reached, the UE may return to operation 404 to wait for the next extended coverage paging transmission.

Once the UE determines that the link budget has been reached, at operation 414 the UE may attempt to decode the PDSCH of the paging message to determine if the paging message is intended for the UE. The number of extended coverage paging transmissions in different paging occasions of the extended coverage paging cycle that are accumulated by the UE prior to the UE attempting to decode the extended coverage paging message may differ dependent on the enhancement level of the UE.

In response to the coverage constrained UE determining, at operation 408, that the paging message is not an extended coverage paging message due, e.g., to its temporal or frequency location, at operation 418 the UE may ignore the paging message. In some embodiments, the UE may simply discard the paging message as the UE is able to determine that the paging message is in a normal paging occasion that is targeted for normal mode UEs from its position or P-RNTI so that no power is wasted on a paging message that the UE recognizes is not intended for the UE. In other embodiments, the UE may not wake up if the paging message does not occur during the extended coverage paging occasion.

In response to the UE determining at operation 406 that it is normal mode, at operation 416 the UE may determine whether the paging message is a legacy paging message. In a manner similar to operation 408, the UE may make the determination based on temporal and/or frequency location of the paging occasion, among others. If the UE determines at operation 416 that the paging message is a legacy paging message, the UE may proceed to operation 414 and decode the paging message to determine whether the paging message is directed to the UE. If the UE determines at operation 416 that the paging message is an extended coverage paging message, the UE may proceed to operation 418 where, as above, the paging message may be summarily dismissed without decoding any of the paging message.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. User equipment (UE) comprising:
a transceiver configured to transmit and receive signals from an enhanced Node B (eNB) in a network; and
processing circuitry configured to:
configure the transceiver to receive from the eNB different types of paging messages comprising legacy paging messages and extended coverage paging messages, the legacy paging messages received at different times from the extended coverage paging messages, a legacy paging cycle of the legacy paging messages and an extended paging cycle of the extended paging messages being different, the extended coverage paging messages configured to be received at extended coverage paging occasions over the extended paging cycle, at least some of consecutive extended coverage paging occasions being between consecutive legacy paging message occasions and at least some of the consecutive extended coverage paging occasions configured to surround other consecutive legacy paging message occasions:
limit decoding of the paging messages to a determined type of paging messages, the determined type of paging messages determined based whether the UE is coverage constrained; and
decode the determined type of paging messages.

2. The UE of claim 1, wherein the processing circuitry is further configured to:
configure the transceiver to receive an indication of physical resource blocks (PRBs) used for the extended coverage paging message when the LIE is in a Radio Resource Control (RRC) connected mode.

3. The UE of claim 2, wherein:
the processing circuitry is further configured to determine limitations on reception of paging messages, the paging messages configured to be received on either a fixed set of PRBs or a semi-statically assigned set of PRBs dependent on the limitations.

4. The UE of claim 2, wherein the processing circuitry is further configured to:
configure the transceiver to receive an indication of PRBs used for the extended coverage paging messages through a system information message.

5. The UE of claim 1, wherein:
the extended coverage paging messages are configured to carry the same information.

6. The UE of claim 5, wherein the processing circuitry is further configured to:
combine the plurality of extended coverage paging messages to form a combined paging message prior to decoding the determined paging message, the plurality of extended coverage paging messages comprising the determined paging message.

7. The UE of claim 1, wherein:
each of the determined type of paging messages is scrambled using a Paging Radio Network Temporary Identifier (P-RNTI) and transmitted on a physical downlink control channel (PDCCH), and the processing circuitry is further configured to determine whether each paging message is an extended coverage paging message or a legacy paging message based on the P-RNTI.

8. The UE of claim 1, wherein:
the extended paging cycle is over multiple frames.

9. The UE of claim 1, wherein the processing circuitry is further configured to:
determine whether each paging message is an extended coverage paging message or a legacy paging message based on a position of the paging message.

10. The UE of claim 1, further comprising:
an antenna configured to provide communications between the transceiver and the eNB.

11. The UE of claim 1, wherein:
the extended paging cycle and the extended coverage paging occasions are different for different levels of coverage enhancement.

12. The UE of claim 11, wherein:
the extended paging cycle and the extended coverage paging occasions for different levels of coverage enhancement are independent, a first extended paging cycle associated with a first level of coverage enhancement is configured to overlap with a second extended paging cycle associated with a second level of coverage enhancement.

13. The UE of claim 1, wherein the processing circuitry is further configured to:
determine the type of a particular paging message dependent on at least one of a temporal or frequency location of a paging occasion corresponding to the particular paging message free from a determination based on a decoded Paging Radio Network Temporary Identifier (P-RNTI) used to scramble the particular paging message.

14. An apparatus of an eNode B (eNB), the apparatus comprising:
a transceiver configured to communicate with user equipment (UE); and
processing circuitry configured to:
determine whether the UE is in a normal mode or the UE is a coverage constrained LE; and
configure the transceiver to transmit:
multiple extended coverage paging messages to the UE over an extended coverage paging cycle in response to determining that the LE is a coverage constrained UE, and
a legacy paging message over a legacy paging cycle in response to determining that the LIE is in normal mode, the legacy paging messages received at different times from the extended coverage paging messages, a legacy paging cycle of the legacy paging messages and an extended paging cycle of the extended paging messages being different,
wherein the multiple extended coverage paging messages and the legacy paging message are transmitted using different Paging Radio Network Temporary Identifiers (P-RNTIs) on a physical downlink control channel (PDCCH), and
at least some of consecutive extended coverage paging occasions are between consecutive legacy paging message occasions and at least some of the consecutive extended coverage paging occasions surround other consecutive legacy paging message occasions.

15. The apparatus of claim 14, wherein:
successive ones of the multiple extended coverage paging messages carry the same information, and the extended coverage paging cycle is longer than the legacy paging cycle.

16. The apparatus of claim 14, wherein the processing circuitry is further configured to:
configure the transceiver to transmit an indication of physical resource blocks (PRBs) used for the extended coverage paging messages through a system information message.

17. The apparatus of claim 14, wherein the processing circuitry is further configured to:
determine whether the LIE is in a Radio Resource Control (RRC) connected mode, and
configure the transceiver to transmit an indication of physical resource blocks (PRBs) used for the extended coverage paging messages in response to determining that the UE is in the RRC connected mode.

18. The apparatus of claim 14, wherein the processing circuitry is further configured to:
determine limitations on paging message reception by the UE, and
configure the transmitter to transmit the extended coverage paging messages on either a fixed or semi-statically assigned set of PRBs or a dynamically assigned set of PRBs dependent on the limitations.

19. The apparatus of claim 14, wherein the processing circuitry is further configured to:

communicate with multiple UEs, at least one of the UEs being a Machine Type Communication (MTC) UE and at least one of the UEs being a non-MTC UE, and configure the transceiver to transmit:
the multiple extended coverage paging messages configured to be received by the MTC UE, and the legacy paging message configured to be received by the non-MTC UE.

20. The apparatus of claim 14, wherein the processing circuitry is further configured to:
configure the transceiver to transmit the extended coverage paging messages in non-legacy paging occasions.

21. A non-transitory computer-readable storage medium that stores instructions for execution by one or more processors of user equipment (UE) to communicate with an evolved Node-B (eNB), the one or more processors to configure the UE to:
receive an extended coverage paging message and a legacy paging message from the eNB, the extended coverage paging message and legacy paging message configured to be scrambled using different Paging Radio Network Temporary Identifiers (P-RNTIs) and to be received at different paging occasions over different paging cycles, the legacy paging message received at a different time from the extended coverage paging message, a legacy paging cycle of the legacy paging message and an extended paging cycle of the extended paging message being different, at least some of consecutive extended coverage paging occasions between consecutive legacy paging message occasions and at least some of the consecutive extended coverage paging occasions surround other consecutive legacy paging message occasions;
determine whether the UE is a coverage constrained UE or a non-coverage constrained UE; and
decode the extended coverage paging message or the legacy paging message dependent on the determination of whether the UE is a coverage constrained UE or a non-coverage constrained UE.

22. The non-transitory computer-readable storage medium of claim 21, the instructions further configuring the UE to:
receive successive extended coverage paging messages, over an extended coverage paging cycle, configured to carry the same information, wherein the extended coverage paging cycle is longer than a legacy paging cycle.

* * * * *

UNITED STATES PATENT AND TRADEMARK OFFICE
CERTIFICATE OF CORRECTION

PATENT NO. : 9,769,788 B2
APPLICATION NO. : 14/706152
DATED : September 19, 2017
INVENTOR(S) : Jha et al.

Page 1 of 1

It is certified that error appears in the above-identified patent and that said Letters Patent is hereby corrected as shown below:

In Column 15, Line 2, in Claim 1, delete "occasions:" and insert --occasions;-- therefor In Column 15, Line 12, in Claim 2, delete "LIE" and insert --UE-- therefor In Column 16, Line 15, in Claim 14, delete "LE;" and insert --UE;-- therefor In Column 16, Line 19, in Claim 14, delete "LE" and insert --UE-- therefor In Column 16, Line 22, in Claim 14, delete "LIE" and insert --UE-- therefor In Column 16, Line 52, in Claim 17, delete "LIE" and insert --UE-- therefor In Column 18, Line 10, in Claim 21, delete "LIE" and insert --UE-- therefor Signed and Sealed this
Tenth Day of April, 2018

Andrei Iancu
*Director of the United States Patent and Trademark Office*